(12) United States Patent
Breulmann et al.

(10) Patent No.: US 8,097,677 B2
(45) Date of Patent: Jan. 17, 2012

(54) MIXTURES CONTAINING THERMOPLASTIC POLYURETHANE AND ACRYLONITRILE-STYRENE-ACRYLIC ESTER COPOLYMER (ASA)

(75) Inventors: Michael Breulmann, Brühl (DE); Matteo Uslenghi, Castronno Va (IT); Graham Edmund Mckee, Neustadt (DE); Frank Uhlhorn, Drebber (DE); Stephan Friederichs, Osnabrück (DE); Johann Diedrich Brand, Turin (IT)

(73) Assignee: BASF Aktiengesellschaft, Ludwigshafen (DE)

( * ) Notice: Subject to any disclaimer, the term of this patent is extended or adjusted under 35 U.S.C. 154(b) by 1802 days.

(21) Appl. No.: 10/554,685

(22) PCT Filed: May 5, 2004

(86) PCT No.: PCT/EP2004/004749
§ 371 (c)(1), (2), (4) Date: Oct. 27, 2005

(87) PCT Pub. No.: WO2004/098878
PCT Pub. Date: Nov. 18, 2004

(65) Prior Publication Data
US 2006/0258805 A1 Nov. 16, 2006

(30) Foreign Application Priority Data
May 9, 2003 (DE) .................. 103 21 081

(51) Int. Cl.
*C08F 8/30* (2006.01)
(52) U.S. Cl. .................. 525/185; 525/123
(58) Field of Classification Search .......... 525/185, 525/123
See application file for complete search history.

(56) References Cited

U.S. PATENT DOCUMENTS

| | | | |
|---|---|---|---|
| 3,055,859 A | 9/1962 | Basf | |
| 4,317,890 A | 3/1982 | Goyert et al. | |
| 4,788,253 A * | 11/1988 | Hambrecht et al. | 525/83 |
| 5,219,643 A | 6/1993 | Schmidt et al. | |
| 5,777,036 A * | 7/1998 | Fischer et al. | 525/285 |
| 6,410,638 B1 | 6/2002 | Kaufhold et al. | |
| 6,589,378 B2 * | 7/2003 | Grefenstein et al. | 156/222 |
| 6,608,139 B1 * | 8/2003 | Guntherberg et al. | 525/70 |
| 6,649,117 B1 * | 11/2003 | Guntherberg et al. | 264/500 |
| 6,656,988 B1 * | 12/2003 | Fischer et al. | 524/315 |
| 6,835,775 B2 * | 12/2004 | Breulmann et al. | 525/69 |
| 2003/0105225 A1 * | 6/2003 | Breulmann et al. | 525/63 |

FOREIGN PATENT DOCUMENTS

| | | |
|---|---|---|
| DE | 28 54 407 | 6/1980 |
| DE | 31 49 358 | 6/1983 |
| DE | 32 27 555 | 1/1984 |
| DE | 39 38 817 | 12/1990 |
| DE | 301 057 | 10/1992 |
| DE | 42 11 415 | 10/1993 |
| DE | 4211415 A1 * | 10/1993 |
| DE | 101 00 225 | 7/2002 |
| EP | 0 475 220 | 3/1992 |
| EP | 0 669 367 | 8/1995 |
| EP | 0 534 212 | 12/1995 |
| EP | 0 698 637 | 2/1996 |
| EP | 1 050 549 | 11/2000 |
| EP | 1 121 392 | 8/2001 |
| WO | WO-00/22045 | 4/2000 |

OTHER PUBLICATIONS

Woods: "The ICI Polyurethanes Book", 1987, XP002298617.

* cited by examiner

*Primary Examiner* — Mark Eashoo
(74) *Attorney, Agent, or Firm* — Connolly Bove Lodge & Hutz LLP

(57) ABSTRACT

Mixture (1) comprising from 1 to 40% by weight of (A) thermoplastic polyurethane based on aliphatic isocyanate and from 60 to 99% by weight of (B) acrylonitrile-styrene-acrylate copolymer (ASA) and/or acrylonitrile-ethylene homo- or copolymer-styrene (AES) material, based in each case on the total weight of the mixture (1).

12 Claims, No Drawings

MIXTURES CONTAINING THERMOPLASTIC POLYURETHANE AND ACRYLONITRILE-STYRENE-ACRYLIC ESTER COPOLYMER (ASA)

This application claims priority from PCT/EP04/004749 filed May 5, 2004 and German Application 103 21 081.4 filed May 9, 2003, the disclosures of each application are incorporated herein by reference.

The invention relates to mixtures (1) comprising from 1 to 40% by weight, preferably from 3 to 30% by weight, particularly preferably from 5 to 25% by weight, of (A) thermoplastic polyurethane based on aliphatic isocyanate and from 60 to 99% by weight, preferably from 70 to 97% by weight, particularly preferably from 75 to 95% by weight, of (B) acrylonitrile-styrene-acrylate copolymer (ASA) and/or acrylonitrile-ethylene homo- or copolymer-styrene (AES) material, preferably acrylonitrile-styrene-acrylate copolymer (ASA), preferably acrylonitrile-styrene-acrylate copolymer (ASA), based in each case on the total weight of the mixture (1), preferably based on the total of the weights (A) and (B) in the mixture (1). The invention also relates to coated materials, preferably using a foil comprising a mixture (1) comprising from 1 to 40% by weight, preferably from 3 to 30% by weight, particularly preferably from 5 to 25% by weight, of (A) thermoplastic polyurethane based on aliphatic isocyanate and from 60 to 99% by weight, preferably from 70 to 97% by weight, particularly preferably from 75 to 95% by weight, of (B) acrylonitrile-styrene-acrylate copolymer (ASA) and/or acrylonitrile-ethylene homo- or copolymer-styrene (AES) material, preferably acrylonitrile-styrene-acrylate copolymer (ASA) based in each case on the total weight of the mixture (1), preferably based on the total of the weights (A) and (B) in the mixture (1). The invention further relates to bodywork parts, in particular roof, tailgate, wheel surround, doors, trunk lids, hinged engine cover of automobiles or of trucks, utility vehicle, lawnmower, tractors of any size, motorcycle, snowmobile, jet-ski, boats, motorhomes, preferably automobiles, and/or wood, e.g. solid wood or particle board, preferably furniture or building materials, e.g. walls of buildings, window frames, beams, coated, preferably in the form of a foil, preferably on the visible surface, with a mixture (1) comprising (A) thermoplastic polyurethane based on aliphatic isocyanate and (B) acrylonitrile-styrene-acrylate copolymer (ASA) and/or acrylonitrile-ethylene homo- or copolymer-styrene (AES) material, preferably acrylonitrile-styrene-acrylate copolymer (ASA) material. The invention further relates to a process for producing bodywork parts and/or wood coated with the inventive mixture comprising (A) thermoplastic polyurethane (TPU) based on aliphatic isocyanate and (B) acrylonitrile-styrene-acrylate copolymer (ASA), and/or acrylonitrile-ethylene homo- or copolymer-styrene (AES) material.

ASA-based foils are longstanding prior art. ASA-based foils feature exceptional weathering resistance and excellent mechanical properties. This combination of properties has helped to give ASA-based foils a wide field of application in the sector of coatings for a very wide variety of materials, such as wood, metal, plastic, etc., in particular in outdoor applications, where no impairment of appearance is acceptable. There is a very wide variety of methods for the coating of surfaces with foils, examples being thermoforming processes, sintering processes, vacuum forming, etc. However, a weakness of this exceptional material ASA resides in relatively low tensile strain at break. This property can have a disadvantageous effect in particular in the case of coatings for materials which have a particularly pronounced surface structure, e.g. sharp edges, corners, or elevations, and which moreover can change their size when environmental conditions change. Mention may be made here, by way of example, of wood, which can absorb significant amounts of water on weathering. This type of swelling can more than double the volume of wood. This type of change in the volume of the ASA-coated material can lead to cracking in the coating, in particular at corners and edges of moldings with a marked surface structure, because the tensile strain at break of the ASA-based coating foil is inadequate.

It is an object of the present invention to provide plastics materials, preferably in the form of foils for the coating of materials, particularly preferably for coatings particularly for wood or bodywork parts, which have excellent weathering properties and scratch resistance, which perform very well when processed to give foils, which are suitable for the coating of a very wide variety of materials, with a significant improvement in tensile strain at break, in particular together with excellent lighfastness.

We have have found that this object is achieved in accordance with the invention by way of the mixtures (1) described at the outset, these preferably being used for the coating of materials, in particular for coated bodywork parts and/or wood. Mixtures composed of thermoplastic polyurethanes, also termed TPUs below, with acrylonitrile-styrene-acrylate copolymers, also termed ASAs below, are well known from EP-B 1 121 392, DD-A 301 057, DE-A 2 854 407, DE-A 4 211 415, and DE-A 3 938 817, inter alia. EP-A 475 220 describes foils which are composed of a mixture of TPU, ASA, and a thermoplastic resin, and are intended to have very good inherent stability, very good resistance to light, heat, and chemicals, and not to generate any gas evolution. Surprisingly, it has been found that the inventive mixture composed of ASA and aliphatic TPU can be prepared in a reliable process and can be processed to give foils, while this mixture features the exceptional mechanical properties and weathering resistance of ASA and moreover has a tensile strain at break which is well above that of pure ASA, and has therefore excellent suitability for the coating of materials which have a pronounced surface structure and can change their size when exposed to weathering.

The acrylonitrile-styrene-acrylate copolymer (B) is preferably based on:
(B1) from 10 to 90% by weight of at least one graft rubber based on
(B11) from 50 to 95% by weight of a graft base prepared using
(B111) from 70 to 99.9% by weight of at least one acrylic ester
(B112) from 0.1 to 30% by weight of at least one at least bifunctional crosslinking agent,
(B113) from 0 to 29.9% by weight of at least one other copolymerizable monomer,
(B12) from 5 to 50% by weight of a graft shell based on
(B121) from 65 to 90% by weight, preferably from 70 to 80% by weight, of at least one vinylaromatic monomer,
(B122) from 10 to 35% by weight, preferably from 20 to 30% by weight, of at least one polar, copolymerizable unsaturated monomer, preferably acrylonitrile and/or methacrylonitrile,
(B123) from 0 to 25% by weight of at least one other copolymerizable comonomer,
(B2) from 10 to 90% by weight of at least one copolymer prepared using the following components:
(B21) from 60 to 85% by weight of at least one vinylaromatic monomer, (B22) from 15 to 40% by weight of at least one polar, copolymerizable unsaturated monomer, (B23) from 0 to 9% by weight of at least one comonomer, where the weight data for (B1) and (B2) are based on the weight of (B), the weight data for (B11 and B12) are based on the weight of (B1), the weight data for (B111), (B112), and (B113) are based on the weight of component (B11), (B121), (B122), and (B123) are based on the weight of (B12), and the weight data for (B21), (B22), and (B23) are based on the weight of (B2).

AES materials are composed of a matrix composed of polystyrene and acrylonitrile and, where appropriate, other monomers. In terms of the above data concerning the preferred component B, AES materials differ from ASA materials in component B11, which in the case of the AES materials can be based on ethylene homo- or copolymers. By way of example, copolymers used are $C_3$-$C_{20}$ alpha-olefins, preferably $C_3$-$C_8$ alpha-olefins. Handbuch der Technischen Polymerchemie, VCH Verlag, 1993, in particular page 490, gives a detailed and well-structured description of AES plastics and processes for their preparation.

The coated materials according to the invention may be well-known materials, such as metals, e.g. iron, steel, aluminum, copper, tin, preferably steel, iron, and/or aluminum, plastics, such as carbon fiber, polystyrene, polyurethanes, styrene copolymers, PVC, these being, where appropriate, foamed and/or reinforced with glass fibers, timber materials, such as solid wood or particle board, in each case based on known types of wood, such as hardwoods and/or softwoods, plastics/wood composites, plastics/natural fiber composites, or other materials based on naturally occurring materials, e.g. natural fibers.

By way of example, the coated materials may comprise the following products: any of the known sheet-like or compact articles and individual parts of an automobile, of a bus, of a truck, of a motorcyle, of a pedal cycle, of an aircraft, of a ship, of an electrical or electronic device, of a household device, of a toy, or of furniture, examples being bodywork parts, protective covers, grips, cladding, load-bearing parts, roofs, floorcoverings, doors, solar installations, electronic or electrical devices of any type, antenna systems, telecommunication systems, air-conditioning systems. Page 15 of WO 00/61664 describes possible products, by way of example.

The materials coated according to the invention, in particular the bodywork parts and/or wood, may preferably be produced by extruding the inventive mixture (1) to give a foil, and using thermoforming processes, sintering processes, lamination, and/or vacuum forming to apply the foil to the surface to be coated, or by using calendering, injection molding, or a known laminating technology to carry out the coating process. The foil comprising the mixture (1) preferably has a thickness of from 0.01 to 2.5 mm, particularly preferably from 0.04 to 0.5 mm. The production of a foil by means of extrusion and/or the other processes described above is well known and is described in detail in the literature. The foil is preferably applied by means of the well-known thermoforming process, sintering process, vacuum forming, and/or lamination to the materials to be coated, i.e. the surface to be coated, in particular the wood surface. In the case of the bodywork parts which are particularly preferred according to the invention, in particular roof, tailgate, wheel surround, doors, trunk lid, or hinged engine cover of automobiles or of trucks, a support based on known metals, e.g. steel, aluminum, iron, and/or plastics, where appropriate foamed and/or reinforced with glass fibers, may be coated with the foil. For the bodywork parts, preference is given to plastics as supports, these being coated with the foil comprising mixture (1).

Preference is therefore also given to bodywork parts in which the bodywork part has a plastics-based support which has been coated with a foil comprising the mixture (1). In the case of the bodywork parts, the process of coating of the support with the foil may, by way of example, use the processes described above described in detail in the literature.

The inventive foil comprising the mixture (1) may have been colored. It is also possible to paint the foil-coated bodywork parts or foil-coated wood parts, for example using well-known paints and well-known processes.

The inventive mixture (1), preferably the foil comprising the inventive mixture (1), preferably has an ISO 527/3 tensile strain at break of >20%, preferably prior to and after weathering (preferably 1000 hours xenon 1200 cps ISO 4892-2A). The inventive mixture (1), preferably the foil comprising the inventive mixture (1), preferably exhibits a yellowness change measured via dE total color difference to DIN 6174 of <6, in the case of non-bright colors including pastels particularly preferably <4, and in the case of strong colors preferably <6, after 1000 hours in the Xenotest 1200 cps to ISO 4892-2A.

The following further details relate to the components present in the inventive mixtures:

The TPU (A) present in the inventive mixtures may comprise well-known TPUs based on aliphatic isocyanates and capable of preparation by known processes via reaction of (a) isocyanates with (b) compounds reactive toward isocyanates, and, where appropriate, (c) chain extenders, in the presence, where appropriate, of (d) catalysts, and/or (e) auxiliaries and/or additives, the ratio of the isocyanate groups in component (a) to the entirety of the isocyanate-reactive groups in components (b) and, where appropriate, (c) usually being from 1:0.9 to 1:1.1.

a) According to the invention, possible isocyanates (a) are aliphatic and/or cycloaliphatic diisocyanates. By way of specific examples, mention may be made of: aliphatic diisocyanates such as hexamethylene-1,6-diisocyanate, 2-methylpenta-methylene 1,5-diisocyanate, 2-ethylbutylene 1,4-diisocyanate, or a mixture composed of at least 2 of the $C_6$-alkylene diisocyanates mention, pentamethylene 1,5-diisocyanate and butylene 1,4-diisocyanate, cycloaliphatic diisocyanates, such as 1-isocyanato-3,3,5-trimethyl-5-isocyanatomethyl-cyclohexane (isophorone diisocyanate), 1,4- and/or 1,3-bis(isocyanatomethyl)cyclohexane (HXDI), cyclohexane 1,4-diisocyanate, 1-methylcyclohexane 2,4- and -2,6-diisocyanate, and the corresponding isomer mixtures, dicyclohexylmethane 4,4'-, 2,4'-, and 2,2'-diisocyanate, and the corresponding isomer mixtures. Hexamethylene 1,6-diisocyanate (HDI) is particularly preferred.

b) Examples of suitable substances (b) reactive toward isocyanates are polyhydroxy compounds with molecular weights of from 500 to 8000, preferably known polyetherols and/or polyesterols. However, it is also possible to use polymers containing hydroxy groups, for example polyacetals, such as polyoxymethylenes and especially water-insoluble formals, e.g. polybutanediol formal and polyhexanediol formal, and aliphatic polycarbonates, in particular those derived from diphenyl carbonate and 1,6-hexanediol and prepared by transesterification, with the abovementioned molecular weights. The polyhydroxy compounds mentioned may be used in the form of individual components or in the form of mixtures.

The mixtures for preparing the TPU(s) are usually at least predominantly based on difunctional substances reactive toward isocyanates, the average functionality of component (b) therefore preferably being from 1.8 to 2.6, particularly preferably from 1.9 to 2.2. The structure of the TPUs is therefore predominantly unbranched, i.e. predominantly not crosslinked.

It is preferable to use polyetherols based on propylene 1,2-oxide and ethylene oxide, in which more than 50%, preferably 60 to 100%, of the OH groups are primary hydroxy groups, and in which at least some of the ethylene oxide has been arranged as a terminal block, and in particular polyoxytetramethylene glycols (polytetrahydrofuran).

The polyetherols, substantially linear in the case of the TPUs, usually have molecular weights of from 500 to 8000, preferably from 600 to 6000 and in particular from 800 to 3500. They may be used either individually or else in the form of mixtures with one another.

By way of example, suitable polyesterols may be prepared from conventional dicarboxylic acids having from 2 to 12 carbon atoms, preferably from 4 to 8 carbon atoms, such as succinic acid, glutaric acid, suberic acid, azelaic acid, sebacic acid, adipic acid, phthalic acid, isophthalic acid, and/or terephthalic acid, and from known polyhydric alcohols, such as ethanediol, 1,3-propanediol, 1,4-butanediol, 1,5-pentanediol, 1,6-hexanediol, 1,10-decanediol, 2,2-dimethyl-1,3-propanediol, 1,2-propanediol, diethylene glycol, and/or dipropylene glycol.

Other suitable compounds are esters of carbonic acid with the diols mentioned, in particular with those having from 4 to 6 carbon atoms, such as 1,4-butanediol and/or 1,6-hexanediol, condensation products of ω-hydroxycarboxylic acids, such as ω-hydroxycaproic acid, and preferably polymerization products of lactones, by way of example of unsubstituted or substituted ω-caprolactones.

Polyesterols used preferably comprise alkanediol polyadipates having from 2 to 6 carbon atoms in the alkylene radical, e.g. ethanediol polyadipates, 1,4-butanediol polyadipates, ethanediol-butane diol 1,4-polyadipates, 1,6-hexanediol-neopentyl glycol polyadipates, polycaprolactones, and in particular 1,6-hexanediol-1,4-butanediol polyadipates.

The polyesterols preferably have molecular weights (weight-average) of from 500 to 6000, particularly preferably from 800 to 3500.

c) Chain extenders (c), which usually have molecular weights of from 60 to 499, preferably from 60 to 300, are preferably alkanediols having from 2 to 12 carbon atoms, preferably having 2, 4 or 6 carbon atoms, e.g. ethanediol, 1,6-hexanediol, and in particular 1,4-butanediol, and dialkylene ether glycols, e.g. diethylene glycol and dipropylene glycol. However, other suitable compounds are diesters of terephthalic acids with alkanediols having from 2 to 4 carbon atoms, e.g. bis(ethanediol) terephthalate or bis(1,4-butanediol) terephthalate, hydroxyalkylene ethers of hydroquinone, e.g. 1,4-di(β-hydroxyethyl)hydroquinone, (cyclo) aliphatic diamines, e.g. 4,4'-diaminodicyclohexylmethane, 3,3'-dimethyl-4,4'-diaminodicyclohexylmethane, 1-amino-3,3,5-trimethyl-5-amino-methylcyclohexane, ethylenediamine, 1,2- or 1,3-propylenediamine, N-methyl-1,3-propylenediamine, N,N'-dimethylethylenediamine, and aromatic diamines, e.g. 2,4- and 2,6-tolylenediamine, 3,5-diethyl-2,4- and -2,6-tolylenediamine and primary, ortho-di-, -tri-, and/or -tetraalkyl-substituted 4,4'-diaminodiphenyl-methanes.

Chain extenders whose use is preferred are alkanediols having from 2 to 6 carbon atoms in the alkylene radical, in particular 1,4-butanediol, and/or dialkylene glycols having from 4 to 8 carbon atoms.

In order to adjust the usual hardness of the TPUs and the melting points of the TPUs, the melts of the structural components (b) and (c) are usually varied to give a molar (b): (c) ratio of from 1:0.8 to 1:10, preferably from 1:1 to 1:6.4, the hardness and the melting point of the TPUs rising as content of diols increases.

Preference is given to TPUs based on:

diphenylmethane 4,4'-diisocyanate (MDI) and/or hexamethylene diisocyanate, (b) polyoxytetramethylene glycol, polyetherols based on 1,2-propylene oxide and ethylene oxide, and/or polyesterols based on alkanediol polyadipate having from 2 to 6 carbon atoms in the alkylene radical, and (c) 1,2-ethanediol, 1,4-butanediol, ethanediol, and/or 1,6-hexanediol, the ratio of the isocyanate groups in component (a) to the total number of isocyanate-reactive groups in components (b) and (c) preferably being from 1:0.9 to 1:1.1, and the molar ratio in which (b) and (c) are used particularly preferably being (b): (c)=from 1:1 to 1:6.4.

Suitable catalysts which in particular accelerate the reaction between the NCO groups of the diisocyanates (a) and the hydroxy groups of the structural components (b) and (c) are the tertiary amines conventionally used and known from the prior art, e.g. triethylamine, dimethylcyclohexylamine, N-methylmorpholine, N,N'-dimethylpiperazine, 2-(dimethylaminoethoxy)ethanol, diazabicyclo[2,2,2]octane, and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like. The amounts used of the catalysts are usually from 0.002 to 0.1 part per 100 parts of polyhydroxy compound (b).

e) Besides catalysts, conventional auxiliaries and/or additives (e) may also be added to the structural components. By way of example, mention may be made of surface-active substances, fillers, flame retardants, nucleating agents, oxidation retardants, stabilizers, lubricants, and mold-release agents, dyes, and pigments, inhibitors, hydrolysis stabilizers, light stabilizers, heat stabilizers, color stabilizers, inorganic and/or organic fillers, reinforcing agents, and plasticizers.

Further details concerning the abovementioned auxiliaries and additives are found in the technical literature.

It is preferable that aromatic structures are absent not only in (a) but also in component (b), and it is particularly preferable that aromatic compounds are absent in components (a) to (e) of the TPUs.

The preparation of the TPUs from, by way of example, the starting components described is well-known and has been widely described. By way of example, the reaction mixture comprising (a), (b), and, where appropriate, (c), (d), and/or (e) may be reacted by the known one-shot process or by the prepolymer process, for example in a reactive extruder, and/or on a conventional belt system. The resultant TPUs may then be pelletized or granulated and processed with component B to give the inventive, preferably homogeneous, mixtures.

A preferred method which may be used to prepare the TPUs A and, respectively, mixtures comprising A and B prepares the thermoplastic polyurethanes via reaction of (a) isocyanates with (b) compounds reactive toward isocyanates and, where appropriate, with (c) chain extenders, in the presence, where appropriate, of (d) catalysts, and/or (e) auxiliaries and/or additives, in the presence of B1, B2, or B as claimed in claim 1, and, where appropriate, then (if the reaction is carried out in the presence of B1 or B2 and not in the presence of component B, comprising B1 and B2) and admixing, with the reaction products, whichever component B1 or B2 was absent during the reaction. The preparation of A in the presence of B1, B2, or B may preferably take place in a reactive extruder under conventional conditions. By way of example, B1, B2, or B may be charged to the hopper of the reactive extruder, and simultaneously and/or at a subsequent point in the extruder the starting materials for preparing A may be added separately or individually, and preferably after they have been intimately mixed.

Mixtures obtainable in this way likewise have markedly improved properties.

The following details may be given, by way of example, concerning the starting materials and preparation processes for component B.

Preferred monomers B111 for preparing the acrylate polymers B11 are alkyl acrylates, usually those having from 1 to 8 carbon atoms, such as methyl acrylate, ethyl acrylate, propyl acrylate, or methyl methacrylate or ethyl methacrylate, particularly preferably those having from 4 to 8 carbon atoms in the alkyl radical, in particular n-butyl acrylate, and/or ethylhexyl acrylate. The acrylates may be used individually or in a mixture during the preparation of the graft base B11.

Examples of suitable at least bifunctional, preferably bi- or trifunctional, crosslinking agent B112 are monomers which contain two or more ethylenic double bonds capable of copolymerization and not 1,3-conjugated. Examples of suitable crosslinking monomers are divinylbenzene, diallyl mealeate, diallyl fumarate, and/or diallyl phthalate, and preferably the acrylate of tricyclodecenyl alcohol, and/or tricyclopentadienyl acrylate, or else allyl (meth)acrylate.

Other possible copolymerizable monomers B113 which may be used are, by way of example, the following compounds: styrene, alpha-methylstyrene, acrylonitrile, methacrylonitrile, phenylmaleimide, acrylamide, and/or vinyl methyl ether.

Vinylaromatic monomers B121 suitable for preparing the shell B12 grafted onto the graft base B11 are preferably styrene and/or styrene derivatives, e.g. styrene, alkylstyrenes, preferably α-methylstyrene, and ring-alkylated styrenes, e.g. p-methylstyrene and/or tert-butylstyrene.

Examples of polar, copolymerizable unsaturated monomers B122 are acrylonitrile and/or methacrylonitrile.

By way of example of possible other copolymerizable monomers B123 use may be made of the following compounds: acrylic acid, methacrylic acid, maleic anhydride, methyl acrate, ethyl acrylate, propyl acrylate, methyl methacrylate, ethyl methacrylate, phenylmaleimide, acrylamide, and/or vinyl methyl ether.

Conventional auxiliaries and/or additives may also be used during the preparation of B1, B11, and/or B12, examples being emulsifiers, such as alkali metal alkyl- or alkylarylsulfonates, alkyl sulfates, sulfonates of fatty alcohols, salts of higher fatty acids having from 10 to 30 carbon atoms or resin soaps, polymerization initiators, e.g. conventional persulfates, such as potassium persulfate, or known redox systems, polymerization auxiliaries, e.g. conventional buffer substances which adjust pH, preferably to a value of from 6 to 9, e.g. sodium bicarbonate and/or sodium pyrophosphate, and/or molecular weight regulators, such as mercaptans, terpinols, and/or dimeric α-methylstyrene, the usual amounts used of the molecular weight regulators being from 0 to 3% by weight, based on the weight of the reaction mixture.

The preparation of ASA materials is well-known from the technical literature and is described by way of example in DE-A 12 60 135, pages 3-4, lines 13-23, and U.S. Pat. No. 3,055,859, pages 2-4, lines 62-10, and also, for two-stage grafting, in DE-A 31 49 358, pages 6-8, lines 16-5, and DE-A 32 27 555, pages 6-8, lines 16-5. A possible method for preparing the inventive ASA materials first prepares the rubbery acrylate polymer serving as graft base B11, e.g. by emulsion polymersization of B111, for example by polymerizing B111 and the at least bifunctional crosslinking agent B112, and, where appropriate, B113, for example in aqueous emulsion in a manner known per se at temperatures of from 20 to 100° C., preferably from 50 to 80° C. A mixture of vinylaromatic monomers B121 with a polar, copolymerizable unsaturated monomer B122, and, where appropriate, B123 may be grafted onto this resultant polyacrylate latex, the graft copolymerization likewise preferably being carried out in aqueous emulsion.

As described in EP-B 534 212, pages 4-5, lines 46-43, the elastomeric component B11 may also be grafted onto a hard core whose structure is composed of the monomers mentioned for B12 and which, where appropriate, has been crosslinked using the monomers mentioned under B12.

This is preferably a hard core with a glass transition temperature Tg>25° C., the proportion of the core B12 being, as described above, from 5 to 50% by weight, based on the weight of B1.

In another particularly preferred embodiment, the grafting may take place in two stages as in DE-A 31 49 358, pages 6-8, lines 16-5, or DE-A 32 27 555, pages 6-8, lines 16-5, and for this the vinylaromatic monomer B121 may first be polymerized in the presence of the graft base B11. The graft copolymerization using a mixture comprising at least one vinylaromatic monomer B121 and at least one polar, copolymerizable monomer B122, and, where appropriate, B123 may then be carried out in the second stage. The amounts used, and present in the ASA materials, of the various components have been described at the outset.

To obtain the ASA materials with good mechanical properties, the polyacrylate serving as graft base has been crosslinked, i.e. its preparation via polymerization of acrylates takes place in the presence of at least bifunctional crosslinking monomers B112.

The particle size of the graft base B11 is preferably from 0.04 to 10 µm, particularly preferably from 0.05 to 2 µm, in particular from 0.07 to 1 µm. The particle size of the graft rubbers B1 is preferably from 0.05 to 15 µm, particularly preferably from 0.06 to 5 µm, in particular from 0.08 to 1.2 µm.

The component B2 which is also present in the inventive mixtures and which can be regarded as a hard matrix is based according to the invention on components B21, B22, and, where appropriate, B23.

By way of example, the following monomers may be used as component B21: well-known vinylaromatic monomers, preferably styrene and/or styrene derivatives, e.g. styrene, alkylstyrenes, preferably α-methylstyrene, and ring-alkylated styrenes, e.g. p-methylstyrene and/or tert-butylstyrene.

By way of example, the following monomers may be used as component B 22: polar, copolymerizable unsaturated monomers well-known for this purpose, e.g. acrylonitrile, methacrylonitrile, acrylic acid, methacrylic acid, alkyl (meth) acrylates having from 1 to 4 carbon atoms in the alkyl radical, for example methyl acrylate, ethyl acrylate, propyl acrylate, methyl methacrylate, and/or ethyl methacrylate, maleic anhydride, phenylmaleimide, acrylamide, and/or vinyl methyl ether, preferably acrylonitrile and/or methacrylonitrile.

Examples of monomers which may be used, where appropriate, as component B 23 also present in B 2 are those well-known for this purpose, such as ethylhexyl acrylate, stearyl acrylate, and/or alkylacrylamides.

B2 may be prepared by well-known methods, e.g. those described in DE-A 31 49 358, page 9, lines 18-32 and DE-A 32 27 555, page 9, lines 18-32, for example via well-known copolymerization of B21, B22, and, where appropriate, B23 in bulk, solution, suspension, or aqueous emulsion at conventional temperatures and pressures in known apparatus, for example as described in Kunststoff-Handbuch, Vieweg-Daumiller, volume V (Polystyrol), Carl-Hanser-Verlag, Munich 1969, p. 124, line 12 et seq.

The components B1 and B2 present in the inventive mixtures may be intimately mixed prior to mixing with the thermoplastic polyurethane A. The components are preferably mixed in assemblies suitable for that purpose (extruders, kneaders, injection-molding machine, press, calender, etc.) at elevated temperatures, preferagbly from 170 to 250, in particular from 180 to 230° C.

The inventive bodywork parts and/or the wood may preferably also comprise auxiliaries and/or additives in addition to (A) and (B). According to the invention, particular preference is given to mixtures (1) comprising from 50 to 99.9% by weight, in particular from 50 to 99% by weight, of A and B and from 0.1 to 50% by weight, in particular from 1 to 50% by weight, of additives, these weight data being based in each case on the total weight of the mixture (1), i.e. in particular based on the total of the weights of A and B and additives in the mixture (1). Examples of additives which may be used are plasticizers, antistatic agents, light stabilizers, lubricants, blowing agents, adhesion promoters, other compatible thermoplastics, such as polyesters (e.g. polyethylene terephthalate, polybutylene terephthalate), polycarbonate, polyamide, polyoxymethylene, polystyrene, polyethylene, polypropylene, polyvinyl chloride, fillers, surface-active substances, flame retardants, dyes, and pigments, antioxidants, hydrolysis stabilizers, light stabilizers, heat stabilizers, or color stabilizers, and/or reinforcing agents. These additives may either be used before completion of the preparation of the TPUs, as described above, or else added to components (A) and/or (B) during the preparation of the mixture.

Light stabilizers which may be used are any of the conventional light stabilizers, for example compounds based on benzophenone, on benzotriazole, on cinnamic acid, on organic phosphites, or on phosphonites. Sterically hindered amines may also be used.

Examples of lubricants which may be used are hydrocarbons, such as oils, paraffins, polyethylene waxes, polypropylene waxes, fatty alcohols having from 6 to 20 carbon atoms, ketones, carboxylic acids, such as fatty acids, montanic acid, or oxidized polyethylene wax, carboxamides, or else carboxylic esters, e.g. with the alcohols ethanol, fatty alcohols, glycerol, ethanediol, pentaerythritol, and with long-chain carboxylic acids as acid component.

Stabilizers used may comprise conventional antioxidants, such as phenolic antioxidants, e.g. alkylated monophenols, esters and/or amides of β-(3,5-di-tert-butyl-4-hydroxyphenyl)propionic acid, and/or benzotriazoles. By way of example possible antioxidants are mentioned in EP-A 698637 and EP-A 669367. Specifically, phenolic antioxidants which may be mentioned are 2,6-di-tert-butyl-4-methylphenol, pentaerythrityl tetrakis[3-(3,5-di-tert-butyl-4-hydroxyphenyl) propionate] and N,N'-di-(3,5-di-tert-butyl-4-hydroxyphenyl-propionyl)hexamethylenediamine. The stabilizers mentioned may be used individually or in mixtures.

When components (A) and (B) are mixed, they are preferably in a flowable, softened or molten state. The homogeneous mixing of the components preferably takes place at temperatures which are above the melting points of (A) and (B). The temperature at which the mixing of the components takes place is usually from 160 to 250° C., preferably from 190 to 240° C., particularly preferably from 200 to 235° C. The mixing of the components to give a homogeneous product may be carried out continuously or batchwise, preferably with devolatilization, using conventional devices which have equipment for heating and stirring, kneading, or rolling. The mixing of the components (A) and (B) preferably takes place in a conventional extruder, and the components A and B here may be fed into the extruder after they have been mixed or individually, for example entirely by way of the hopper, or else to some extent at a subsequent point on the extruder, into the molten or solid product present within the extruder.

The components, and in particular the TPU, are preferably dried prior to processing. In one particularly preferred process, the components B1 and B2 are separately premixed (preferably in the extruder) and the resultant compounded material is then mixed with component A under the conditions stated above.

The components mixed in the melt are then preferably cooled and simultaneously, or else after some cooling has, where appropriate, first taken place, comminuted and in particular pelletized. The resultant products serve for further processing via injection molding, extrusion, calendering, compression molding, blowing processes, etc., in particular to give foils via extrusion.

These advantages will be illustrated using the examples below.

EXAMPLES

In the examples, the starting components stated in Table 1 were processed by means of a conventional twin-screw extruder at a melt temperature of about 210° C. to give the mixtures. Using the mixtures of Comparative Example 1 and Inventive Example 1, foils with a thickness of 0.250 mm were produced by extrusion, using a single-screw extruder, 30 D, melt temperature 190-240° C., and conventional other conditions.

TABLE 1

|  | Mixture of Comparative Example 1 | Mixture of Inventive Example 1 |
|---|---|---|
| ASA [% by weight] | 100 | 85 |
| TPU [% by weight] | — | 15 |
| Tensile strain at break to DIN EN ISO 527 (12) | 4% | 65% |

ASA: Luran ® S 797 SE (ASA from BASF Aktiengesellschaft)
TPU: TPU based on aliphatic isocyanate Table 2 shows the properties of the foils produced. The methods for mechanical measurements were those of ISO 527/3 and xenon 1200 ISO 4892/2.

TABLE 2

| | Mechanical properties | | | | |
|---|---|---|---|---|---|
| Removal time | σ | σ | ε | ε | tensile modulus of elasticity |
| Comparative Example 1 | | | | | |
| 0 h | 34.1 | 27.8 | 2.9 | 12.9 | 1698 |
| 500 h | 34 | 28.4 | 2.7 | 7.4 | 1697 |
| 1000 h | 34.5 | 28.4 | 2.5 | 5.48 | 1751 |
| Inventive Example 1 | | | | | |
| 0 h | 24.6 | 21.9 | 3.5 | 52.9 | 1278 |
| 500 h | 24.6 | 21.4 | 3.4 | 44.1 | 1173 |
| 1000 h | — | 21.6 | — | 26.14 | 1308 |

From comparison of the examples it is clear that according to the invention the tensile strain at break could be markedly improved to a value greater than 20%, even after artificial weathering.

The color measurements were carried out in accordance with DIN 6174 and xenon 1200 ISO 4892/2.

TABLE 3

| | Color properties | | | | | |
|---|---|---|---|---|---|---|
| Removal time | Yellow-ness index | Gloss | dE | dL | dA | dB |
| Comparative Example 1 | | | | | | |
| 0 hour | 5.7 | 7.0 | 0.0 | 0.0 | 0.0 | 0.0 |
| 500 hours | 2.6 | 6.5 | 1.7 | 0.5 | 0.1 | −1.6 |
| 1000 hours | 2.8 | | 1.7 | 0.8 | 0.0 | −1.5 |
| Inventive Example 1 | | | | | | |
| 0 hour | 8.4 | 5.9 | 0.0 | 0.0 | 0.0 | 0.0 |
| 500 hours | 4.7 | 5.7 | 2.1 | 0.5 | 0.1 | −2.0 |
| 1000 hours | 4.6 | | 2.3 | 1.0 | 0.1 | −2.1 |

An important parameter describing stability on weathering is the total color deviation, dE in Table 3. Even after 1000 hours, this is markedly less than 4.

We claim:

1. A bodywork part and/or a wood coated with a mixture (1) comprising (A) thermoplastic polyurethane based on aliphatic isocyanate and (B) acrylonitrile-styrene-acrylate copolymer (ASA), wherein the acrylonitrile-styrene-acrylate copolymer (B) based on
   (B1) from 10 to 90% by weight of at least one graft rubber based on
      (B11) from 50 to 95% by weight of a graft base prepared using
         (B111) from 70 to 99.9% by weight of at least one acrylic ester;
         (B112) from 0.1 to 30% by weight of at least one at least bifunctional crosslinking agent;
         (B113) from 0 to 29.9 of at least one other copolymerizable monomer;
      (B12) from 5 to 50% by weight of a graft shell based on
         (B121) from 65 to 90% by weight, of at least one vinylaromatic monomer;
         (B122) from 10 to 35% by weight, of at least one polar, copolymerizable unsaturated monomer, preferably acrylonitrile and/or methacrylonitrile;
         (B123) from 0 to 25% by weight of at least one other copolymerizable comonomer; and
   (B2) from 10 to 90% by weight of at least one copolymer prepared using the following components:
      (B21) from 60 to 85% by weight of at least one vinylaromatic monomer;
      (B22) from 15 to 40% by weight of at least one polar, copolymerizable unsaturated monomer,
      (B23) from 0 to 9% by weight of at least one comonomer; and
   wherein the weight data for (B1) and (B2) are based on the weight of (B), the weight data for (B11 and B12) are based on the weight of (B1), the weight data for (B111), (B112), and (B113) are based on the weight of component (B11), (B121), (B122), and (B123) are based on the weight of (B12), and the weight data for (B21), (B22), and (B23) are based on the weight of (B2); and
   wherein the mixture (1) comprises from 1 to 40% by weight of (A) and from 60 to 99% by weight of (B), based in each case on the total weight of the mixture (1).

2. A bodywork part and/or a wood as claimed in claim 1, wherein the thermoplastic polyurethane is based on hexamethylene diisocyanate as isocyanate (a).

3. A bodywork part as claimed in claim 2, which has a support based on plastic and coated with a foil comprising the mixture (1).

4. An item of furniture coated with a mixture (1) as claimed in claim 2.

5. A process for producing bodywork parts and/or wood coated with a mixture (1) as claimed in claim 2, which comprises extruding the mixture to give a foil, and using thermoforming processes, sintering processes, lamination, and/or vacuum forming to apply the foil to the surface to be coated.

6. A bodywork part and/or a wood as claimed in claim 1, wherein the mixture (1) comprises, in addition to (A) and (B), from 1 to 50% by weight of additives, based on the total weight of the mixture (1).

7. A bodywork part as claimed in claim 6, which has a support based on plastic and coated with a foil comprising the mixture (1).

8. An item of furniture coated with a mixture (1) as claimed in claim 6.

9. A process for producing bodywork parts and/or wood coated with a mixture (1) as claimed in claim 6, which comprises extruding the mixture to give a foil, and using thermoforming processes, sintering processes, lamination, and/or vacuum forming to apply the foil to the surface to be coated.

10. A bodywork part as claimed in claim 1, which has a support based on plastic and coated with a foil comprising the mixture (1).

11. An item of furniture coated with a mixture (1) as claimed in claim 1.

12. A process for producing bodywork parts and/or wood coated with a mixture (1) as claimed in claim 1, which comprises extruding the mixture to give a foil, and using thermoforming processes, sintering processes, lamination, and/or vacuum forming to apply the foil to the surface to be coated.

* * * * *